(12) United States Patent
Xie et al.

(10) Patent No.: US 11,627,084 B2
(45) Date of Patent: Apr. 11, 2023

(54) PACKET SENDING METHOD, DEVICE, AND SYSTEM

(71) Applicant: HUAWEI TECHNOLOGIES CO.,LTD., Guangdong (CN)

(72) Inventors: Jingrong Xie, Beijing (CN); Yang Xia, Beijing (CN); Gang Yan, Beijing (CN); Shunwan Zhuang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/135,698

(22) Filed: Dec. 28, 2020

(65) Prior Publication Data

US 2021/0119921 A1 Apr. 22, 2021

Related U.S. Application Data

(63) Continuation of application No. PCT/CN2019/091437, filed on Jun. 15, 2019.

(30) Foreign Application Priority Data

Jun. 27, 2018 (CN) .......................... 201810678773.3

(51) Int. Cl.
H04L 47/125 (2022.01)
H04L 45/16 (2022.01)
H04L 45/74 (2022.01)

(52) U.S. Cl.
CPC ............ *H04L 47/125* (2013.01); *H04L 45/16* (2013.01); *H04L 45/74* (2013.01)

(58) Field of Classification Search
None
See application file for complete search history.

(56) References Cited

U.S. PATENT DOCUMENTS 10,608,922 B2 * 3/2020 Dutta ................. H04L 61/5038
2015/0078377 A1 3/2015 Wijnands et al.
(Continued)

FOREIGN PATENT DOCUMENTS

CN 104811387 A 7/2015
CN 105812197 A 7/2016
(Continued)

OTHER PUBLICATIONS

J. Xie et al.,"Use of BIER Entropy for Data Center CLOS Networks draft-xie-bier-entropy-staged-dc-clos-00", Network Working Group Internet-Draft, Jul. 2, 2018, total 9 pages.
(Continued)

*Primary Examiner* — Phirin Sam
(74) *Attorney, Agent, or Firm* — James Anderson Harrison

(57) ABSTRACT

The method includes: generating, by a first device, a first packet including a BIER header, where the BIER header includes entropy, and the entropy includes a first part and a second part; determining, by the first device based on the first packet, that there are a plurality of forwarding entries used to forward the first packet; selecting, by the first device, one forwarding entry from the plurality of forwarding entries based on the first part, where the selected forwarding entry includes an address of a second device, and the second device is a next-hop device of the first device; and sending, by the first device, the first packet to the second device, where the second part is used by the second device to select, from a plurality of forwarding entries used to forward the first packet, a forwarding entry used by the second device to forward the first packet.

16 Claims, 6 Drawing Sheets

(56) References Cited

U.S. PATENT DOCUMENTS

| | | | | |
|---|---|---|---|---|
| 2015/0131658 | A1* | 5/2015 | Wijnands | H04L 45/7453 370/392 |
| 2015/0131660 | A1* | 5/2015 | Shepherd | H04L 45/74 370/390 |
| 2015/0181309 | A1* | 6/2015 | Shepherd | H04N 21/64322 725/109 |
| 2016/0088313 | A1* | 3/2016 | Penney | H04N 19/593 382/234 |
| 2016/0119159 | A1 | 4/2016 | Zhao et al. | |
| 2018/0091473 | A1* | 3/2018 | Wijnands | H04L 65/611 |
| 2018/0316520 | A1* | 11/2018 | Wijnands | H04L 45/745 |
| 2019/0014034 | A1* | 1/2019 | Allan | H04L 45/24 |
| 2019/0097943 | A1* | 3/2019 | Kotalwar | H04L 12/185 |
| 2019/0297000 | A1* | 9/2019 | Dutta | H04L 45/16 |

FOREIGN PATENT DOCUMENTS

| | | |
|---|---|---|
| CN | 105933228 A | 9/2016 |
| CN | 106603413 A | 4/2017 |
| CN | 106656794 A | 5/2017 |
| CN | 107124366 A | 9/2017 |
| CN | 107171977 A | 9/2017 |
| CN | 107294861 A | 10/2017 |
| CN | 107623630 A | 1/2018 |
| CN | 107645446 A | 1/2018 |
| WO | 2016188502 A1 | 12/2016 |
| WO | 2016198013 A1 | 12/2016 |
| WO | 2016198016 A2 | 12/2016 |

OTHER PUBLICATIONS

P. Lapukhov et al,"Use of BGP for Routing in Large-Scale Data Centers", Internet Engineering Task Force (IETF), Request for Comments: 7938, Aug. 2016, total 35 pages.

IJ. Wijnands, Ed. et al,"Multicast Using Bit Index Explicit Replication (BIER)", Internet Engineering Task Force (IETF), Request for Comments: 8279, Nov. 2017, total 43 pages.

IJ. Wijnands, Ed. et al.,"Encapsulation for Bit Index Explicit Replication (BIER) in MPLS and Non-MPLS Networks", Internet Engineering Task Force (IETF), Request for Comments: 8296, Jan. 2018, total 24 pages.

Gaofeng Tao et al: Bit Index Explicit Replication Tree Trace Operation Administration and Maintenance Using Proxy Mode ip.com ip.com Inc. West Hen rietta NY US Nov. 30, 2015 (Nov. 30, 2015) XP013168633 ISSN:1533 0001,Total:10Pages.

Muhammad Shahbaz et al: Elmo:Source Routed Multicast for Cloud Services arxiu.0 rg Cornell University Library 2010 Lin Library Cornell University Ithaca NY14853 Feb. 27, 2018 (Feb. 27, 2018) XP081213189 Total:16Pages.

A. Giorgetti, A. Sgambelluri, F. Paolucci, N. Sambo, P. Castoldi and F. Cugini, "Bit Index Explicit Replication (BIER) multicasting in transport networks," 2017 International Conference on Optical Network Design and Modeling (ONDM), 2017, pp. 1-5, doi: 10.23919/ONDM.2017.7958551.

Lu Yixuan, ZTE"s innovative core router "two new tricks", backbone network traffic optimization is more intelligent, 2018, 6 pages.

Ij Wijnands et al: "Multicast using Bit Index Explicit Replication",Internet Engineering Task Force, Intended status: Standards Track, Apr. 27, 2015 (Apr. 27, 2015), pp. 1-31, XP055361863,Retrieved from the Internet:URL:https://tools.ietf.org/pdf/draft-ietf-bier-architecture-00.pdf[retrieved on Apr. 5, 2017].

* cited by examiner

PACKET SENDING METHOD, DEVICE, AND SYSTEM

CROSS-REFERENCE TO RELATED APPLICATIONS

This application is a continuation of International Application No. PCT/CN2019/091437, filed on Jun. 15, 2019, which claims priority to Chinese Patent Application No. 201810678773.3, filed on Jun. 27, 2018. The disclosures of the aforementioned applications are hereby incorporated by reference in their entireties.

TECHNICAL FIELD

The present application relates to the field of communications technologies, and in particular, to a packet sending method, device, and system.

BACKGROUND

Bit index explicit replication (BIER) is a multicast forwarding technology developed through discussion by the Internet Engineering Task Force (IETF) in 2014. In the requirement for comments (RFC) 8279, an entropy value of a BIER header is defined to be used for traffic load sharing. For example, in a system 100 shown in FIG. 1, devices A, D, E, and F are edge nodes in a BIER domain. When both first traffic and second traffic need to be sent by the device A to the device F, a value 1 may be assigned to entropy when the device A encapsulates the first traffic with a BIER header, and a value 2 is assigned to the entropy when the device A encapsulates the second traffic with the BIER header. In this way, when receiving the first traffic and the second traffic, a device B allows, based on the different entropy values, the first traffic to flow through the device A, the device B, a device C, and the device F in sequence to reach the device F, and the second traffic to flow through the device A, the device B, the device E, and the device F in sequence to reach the device F, to implement traffic load sharing.

With rapid development and wide application of a multi-stage network, for example, in a data center CLOS network, there are more than two devices at each stage in the network, that is, the devices at each stage in the network have a plurality of equal-cost paths. However, the devices at each stage in the multi-stage network cannot flexibly perform load sharing according to the foregoing method.

SUMMARY

Embodiments of this application provide a packet sending method, device, and system, to implement load sharing forwarding of different devices based on different parts of entropy of a BIER header, so that load sharing of a data flow is flexibly implemented by devices at each stage in a multi-stage network based on different parts of same entropy.

According to a first aspect, this application provides a packet sending method. The method includes: generating, by a first device, a first packet including a BIER header, where the BIER header includes Entropy, the entropy is used to forward the first packet along a forwarding path, the entropy includes a first part and a second part, and the first part is different from the second part; determining, by the first device based on a destination address of the first packet, that there are a plurality of forwarding entries used to forward the first packet; selecting, by the first device, one forwarding entry from the plurality of forwarding entries based on the first part, where the selected forwarding entry includes an address of a second device, and the second device is a next-hop device of the first device; and sending, by the first device, the first packet to the second device, where the second part is used by the second device to select one forwarding entry from a plurality of forwarding entries used to forward the first packet.

According to the foregoing method, the first device may perform load sharing on a packet based on the first part, and the second device may also perform load sharing on the packet based on the second part. In this way, load sharing forwarding of different devices may be implemented by using different parts of the entropy, and a path of a data flow is controlled, thereby implementing multi-stage load sharing of the packet.

With reference to the first aspect, in a first possible implementation, the first part and the second part occupy different bits of the entropy.

The multi-stage load sharing of the packet is implemented by using different bits of the entropy in the BIER header of the packet.

With reference to the first aspect, in a second possible implementation, the first device determines an entropy value of the BIER header of the first packet based on a quantity of the plurality of forwarding entries on the first device that are used to forward the first packet and a quantity of the plurality of forwarding entries on the second device that are used to forward the first packet. That there are a plurality of forwarding entries on the first device that are used to forward the first packet means that there are a plurality of load sharing paths on the first device that are used to forward the first packet, and that there are a plurality of forwarding entries on the second device that are used to forward the first packet means that there are a plurality of load sharing paths on the second device that are used to forward the first packet. The first device generates the entropy based on a quantity of load sharing paths on the first device and a quantity of load sharing paths on the second device, so that a forwarding entry used by each device to forward the first packet can be accurately controlled. For example, if the first part is set to 0001, the first device sends the first packet through a first forwarding path in a plurality of forwarding paths; and if the second part is set to 0003, the second device sends the first packet through a third forwarding path in the plurality of forwarding paths. In this way, a forwarding path for forwarding the first packet by each of a plurality of devices is separately controlled.

With reference to the first aspect, in a third possible implementation, the generating, by a first device, a first packet including a BIER header includes: receiving, by the first device, a second packet from a fourth device; and generating, by the first device, the first packet by encapsulating the second packet with the BIER header.

With reference to the first aspect, in a fourth possible implementation, the forwarding entry may be a bit index forwarding table (BIFT).

With reference to the first aspect, in a fifth possible implementation, the entropy value is equal to a sum of a value of the first part and a value of the second part, where the value of the first part is generated based on the quantity of the plurality of forwarding entries on the first device that are used to forward the first packet, and the value of the second part is generated based on the quantity of the plurality of forwarding entries on the second device that are used to forward the first packet.

According to a second aspect, this application provides a packet sending method. The method includes: receiving, by a second device, a first packet sent by a first device, where the first packet includes a BIER header, the BIER header includes Entropy, the entropy is used to forward the first packet along a forwarding path, the entropy includes a first part and a second part, the first part is different from the second part, and the first part is used by the first device to select one forwarding entry from a plurality of forwarding entries used to forward the first packet; determining, by the second device based on a destination address of the first packet, that there are a plurality of forwarding entries used to forward the first packet; selecting, by the second device, one forwarding entry from the plurality of forwarding entries based on the second part, where the selected forwarding entry includes an address of a third device, and the third device is a next-hop device of the second device; and sending, by the second device, the first packet to the third device.

With reference to the second aspect, in a first possible implementation, the first part and the second part occupy different bits of the entropy.

With reference to the second aspect, in a second possible implementation, the first device determines an entropy value of the BIER header of the first packet based on a quantity of the plurality of forwarding entries on the first device that are used to forward the first packet and a quantity of the plurality of forwarding entries on the second device that are used to forward the first packet.

With reference to the second aspect, in a third possible implementation, the entropy further includes a third part, and the third part is different from both the first part and the second part. The third part is used by the third device to select a forwarding entry from a plurality of forwarding entries used to forward the first packet, and the third device has a plurality of equal- cost paths for sending the first packet.

According to a third aspect, this application provides a packet sending device. The device includes a generation unit, a determining unit, a selection unit, and a sending unit. The generation unit is configured to generate a first packet including a BIER header. The BIER header includes Entropy. The entropy is used to forward the first packet along a forwarding path. The entropy includes a first part and a second part, and the first part is different from the second part. The determining unit is configured to determine, based on a destination address of the first packet, that there are a plurality of forwarding entries used to forward the first packet. The selection unit is configured to select one forwarding entry from the plurality of forwarding entries based on the first part. The selected forwarding entry includes an address of a second device, and the second device is a next-hop device of the device. The sending unit is configured to send the first packet to the second device. The second part is used by the second device to select one forwarding entry from a plurality of forwarding entries used to forward the first packet.

With reference to the third aspect, in a first possible implementation, the first part and the second part occupy different bits of the entropy.

With reference to the third aspect, in a second possible implementation, the determining unit is further configured to determine an entropy value of the BIER header of the first packet based on a quantity of the plurality of forwarding entries on the first device that are used to forward the first packet and a quantity of the plurality of forwarding entries on the second device that are used to forward the first packet.

With reference to the third aspect, in a third possible implementation, the device further includes a receiving unit, where the receiving unit is configured to receive a second packet from a fourth device. The generation unit is configured to generate the first packet by encapsulating the second packet with the BIER header.

According to a fourth aspect, this application provides a packet sending device. The device includes a receiving unit, a determining unit, a selection unit, and a sending unit. The receiving unit is configured to receive a first packet sent by a first device. The first packet includes a BIER header, and the BIER header includes entropy. The entropy is used to forward the first packet along a forwarding path, the entropy includes a first part and a second part, and the first part is different from the second part. The first part is used by the first device to select one forwarding entry from a plurality of forwarding entries used to forward the first packet. The determining unit is configured to determine, based on a destination address of the first packet, that there are a plurality of forwarding entries used to forward the first packet. The selection unit is configured to select one forwarding entry from the plurality of forwarding entries based on the second part. The selected forwarding entry includes an address of a third device, and the third device is a next-hop device of the second device. The sending unit is configured to send the first packet to the third device.

With reference to the fourth aspect, in a first possible implementation, the first part and the second part occupy different bits of the entropy.

With reference to the fourth aspect, in a second possible implementation, an entropy value of the BIER header of the first packet is determined based on a quantity of the plurality of forwarding entries on the first device that are used to forward the first packet and a quantity of the plurality of forwarding entries on the second device that are used to forward the first packet.

According to a fifth aspect, this application provides a system for sending a packet. The system includes a first device and a second device. The first device is configured to: generate a first packet including a BIER header, determine, based on a destination address of the first packet, that there are a plurality of forwarding entries used to forward the first packet, select one forwarding entry from the plurality of forwarding entries based on a first part, and send the first packet to the second device. The BIER header includes Entropy. The entropy is used to forward the first packet along a forwarding path. The entropy includes the first part and a second part, and the first part is different from the second part. The selected forwarding entry includes an address of the second device, and the second device is a next-hop device of the first device.

The second device is configured to: receive the first packet sent by the first device, determine, based on the destination address of the first packet, that there are a plurality of forwarding entries used to forward the first packet, select one forwarding entry from the plurality of forwarding entries based on the second part, and send the first packet to a third device, where the third device is a next-hop device of the second device.

With reference to the fifth aspect, in a first possible implementation, the first part and the second part occupy different bits of the entropy.

With reference to the fifth aspect, in a second possible implementation, the first device is further configured to determine an entropy value of the BIER header of the first packet based on a quantity of the plurality of forwarding entries on the first device that are used to forward the first packet and a quantity of the plurality of forwarding entries on the second device that are used to forward the first packet.

With reference to the fifth aspect, in a third possible implementation, the first device is further configured to: receive a second packet from a fourth device, and generate the first packet by encapsulating the second packet with the BIER header.

According to a sixth aspect, this application provides a computer-readable storage medium. The computer-readable storage medium stores an instruction, and when the instruction is run on a computer, the computer is enabled to perform the method according to the first aspect and the possible implementations.

According to a seventh aspect, this application provides another computer-readable storage medium. The computer-readable storage medium stores an instruction, and when the instruction is run on a computer, the computer is enabled to perform the method according to the second aspect and the possible implementations.

According to an eighth aspect, this application provides a device. The device includes a network interface, a processor, a memory, and a bus that connects the network interface, the processor, and the memory. The memory is configured to store a program, an instruction, or code. The processor is configured to execute the program, the instruction, or the code in the memory, to implement the method according to the first aspect and the possible implementations.

According to a ninth aspect, this application provides a device. The device includes a network interface, a processor, a memory, and a bus that connects the network interface, the processor, and the memory. The memory is configured to store a program, an instruction, or code. The processor is configured to execute the program, the instruction, or the code in the memory, to implement the method according to the second aspect and the possible implementations.

DESCRIPTION OF EMBODIMENTS

In the specification, claims, and accompanying drawings of the present application, the terms "first", "second", and so on (if existent) are intended to distinguish similar objects, but do not need to be used to describe a specific order or sequence. It should be understood that the data termed in such a way are interchangeable in proper circumstances so that the embodiments described herein can be implemented in other orders than the order illustrated or described herein. Moreover, the terms "include", "contain" and any other variants mean to cover the non-exclusive inclusion, for example, a process, method, system, product, or device that includes a list of steps or units is not necessarily limited to the expressly listed steps or units, but may include other steps or units not expressly listed or inherent to such a process, method, system, product, or device.

Figure 1:
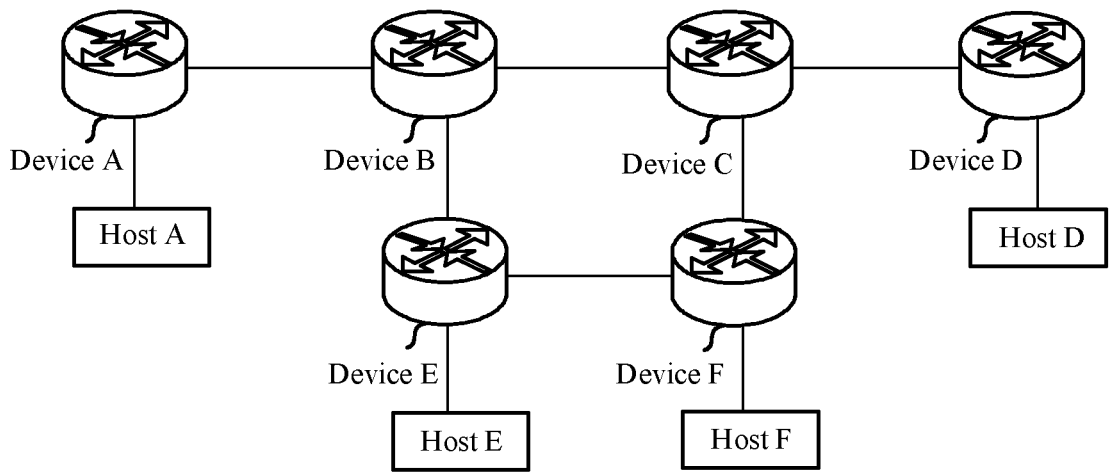
FIG. 1 is a schematic diagram of an application scenario in which a packet is to be sent according to an embodiment of the present application.

FIG. 1 is a schematic architectural diagram of a packet sending system. The system 100 includes devices A, B, C, D, E, and F, and a host A connected to the device A, a host E connected to the device E, a host F connected to the device F, and a host D connected to the device D. The device connected to the host may also be referred to as an edge device. For example, the device A may also be referred to as an edge device A, and the edge device may encapsulate a packet received outside a BIER domain with a BIER header and forward the packet carrying the BIER header. The system 100 may send a multicast packet, or send a unicast packet. The packet may also be encapsulated with the BIER header by the edge device A, D, E, or F, and load sharing is performed on the packet by using the BIER header. For example, both a first packet and a second packet are sent by the device A to the device F, and the device A may encapsulate the first packet and the second packet with BIER headers. A value 1 is assigned to an entropy value when the device A encapsulates the first packet with the BIER header, a value 2 is assigned to the entropy value when the device A encapsulates the second packet with the BIER header, and the device A sends a first packet and a second packet that are obtained through encapsulation to the device B. Because there are two equal-cost paths from the device B to the device F, to be specific, the device B may send the packet to the device C or may send the packet to the device E, the device B has two forwarding entries. The device B receives the first packet and the second packet, and performs load sharing on the first packet and the second packet based on the entropy values in the respective BIER headers of the first packet and the second packet and based on the forwarding entries of the device B. For a specific method in which the device B forwards the packet based on the entropy of the BIER header of the packet and the forwarding entries, refer to a related method described in "BIER Intra-Domain Forwarding Procedures" in section 6 of the RFC8279 protocol. Details are not described herein again.

In the foregoing solution, the device B uses a 20-bit value of an entropy field as a whole, to be specific, uses a value assigned to the entropy field as a whole to determine a path for sending the multicast packet. In other words, devices A1, B1, A2, and B2 that are connected to hosts can perform load sharing on the packet based on the entropy value in the BIER header of the packet. However, devices C1, D1, C2, D2, and the like cannot continue to perform load sharing on the received packet based on the entropy value in the BIER header of the packet. For example, in FIG. 2, if the device A1 needs to replicate traffic to the devices A2 and B2, the traffic may flow from the device A1 to a device S1 or S2 through the device C1, and a path used by the device S1 or S2 to replicate the traffic downstream to the devices A2 and B2 is fixed. Alternatively, the traffic may flow from the device A1 to a device S3 or S4 through the device D1, and a path used by the device S3 or S4 to replicate the traffic downstream to the devices A2 and B2 is fixed. In a conventional solution, traffic load sharing is performed through four different paths. A packet is encapsulated with a BIER header, and entropy=1 is assigned. In this case, the packet is sent by the device A1 to the device C1, and the device C1 may choose to send the packet to the device S1. If entropy=2 is assigned when the packet is encapsulated with the BIER header, the device A1 chooses to send the packet to the device D1, and the device D1 may choose to send the packet to the device S4. If entropy=3 is assigned when the packet is encapsulated with the BIER header, a selected path for sending the packet may be from the device A1 to the device S1 through the device C1. If entropy=4 is assigned during packet encapsulation, a selected path for sending the packet may be from the device A1 to the device S4 through the device D1. Although four entropy values are separately used during packet encapsulation, load sharing of a to-be-sent data flow by devices at each stage cannot be implemented. Consequently, a path from the device A1 to the device S2 through the device C1 and a path from the device A1 to the device S3 through the device D1 are not used to send the data flow, but traffic may be excessively heavy on another path used to send the data flow. This results in traffic overload on some paths.

To resolve the foregoing technical problem, a new packet sending method is provided in this application. In the method, load sharing of a to-be-sent packet by devices at each stage may be implemented based on different identifiers. The method is not only applicable to the system 100 shown in FIG. 1, but also applicable to a multi-stage CLOS network system 200 shown in FIG. 2, to implement packet load sharing.

Figure 2:
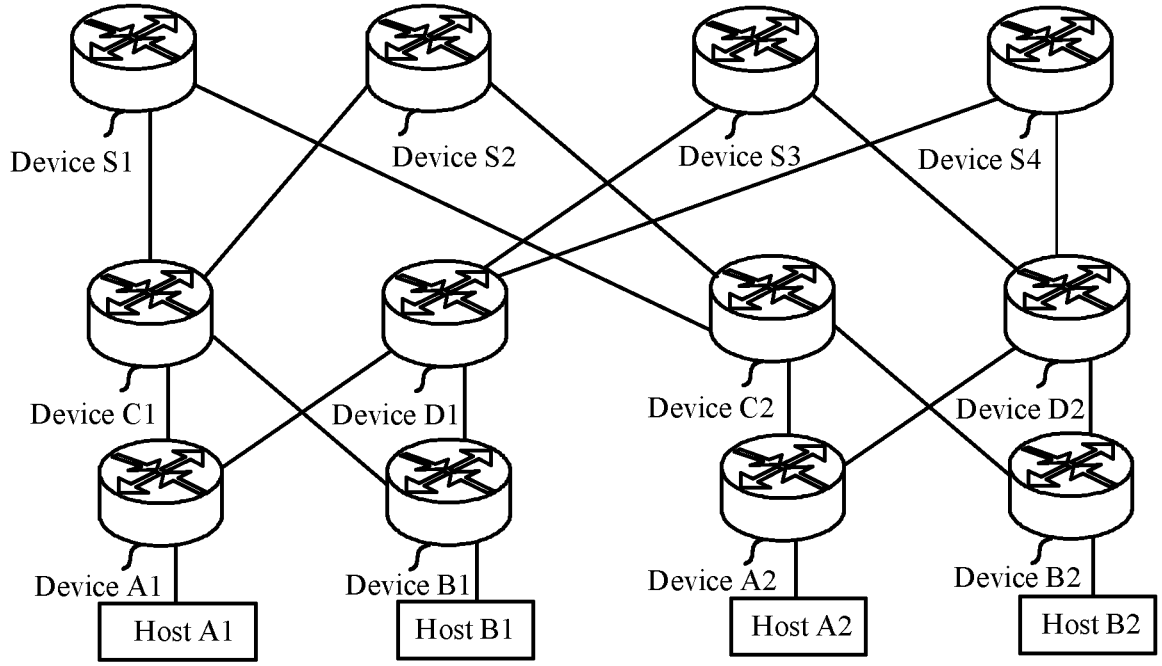
FIG. 2 is a schematic diagram of another application scenario in which a packet is to be sent according to an embodiment of the present application.

The new method provided in this application is described by using the system 200 shown in FIG. 2 as an example. In the system 200, a device at each tier has a plurality of load sharing paths. A device A1 connected to a host A1 and a device B1 connected to a host B1 may be referred to as third-tier devices in a multi-stage network, or may be referred to as first-stage leaf nodes or access tier devices. The device A1 and the device B1 may be devices such as routers or switches that have a data forwarding function, and the devices can encapsulate, with a BIER header, a packet received from a host. Similar to the devices A1 and B1, devices A2 and B2 may also be referred to as third-tier devices, first-stage leaf nodes, or access tier devices, and intermediate tier devices C1, D1, C2, and D2 are referred to as second-stage devices, or may be referred to as second-stage leaf nodes or aggregation tier devices in a multi-tier network. Upper-tier devices S1, S2, S3, and S4 may be referred to as first-tier devices, core tier devices, or the like in the multi-tier network. In the multi-tier network system 200, the third-tier device A1 receives a packet from the host A1, and encapsulates the packet with a BIER header, and assigns a value to entropy. The third-tier device performs loading sharing on the packet based on a BIFT of the third-tier device and a part of the entropy value of the BIER header of the packet, and sends the packet to the second-stage devices C1 and D1. After receiving the packet, the second-stage devices C1 and D1 perform load sharing on the packet based on BIFTs of the devices and another part of the entropy of the BIER header of the packet, and send the packet to the first-stage devices S1 and S2. In this way, a path for sending a data flow is precisely controlled, so that load sharing of the packet can be implemented in the multi-stage network.

Figure 3:
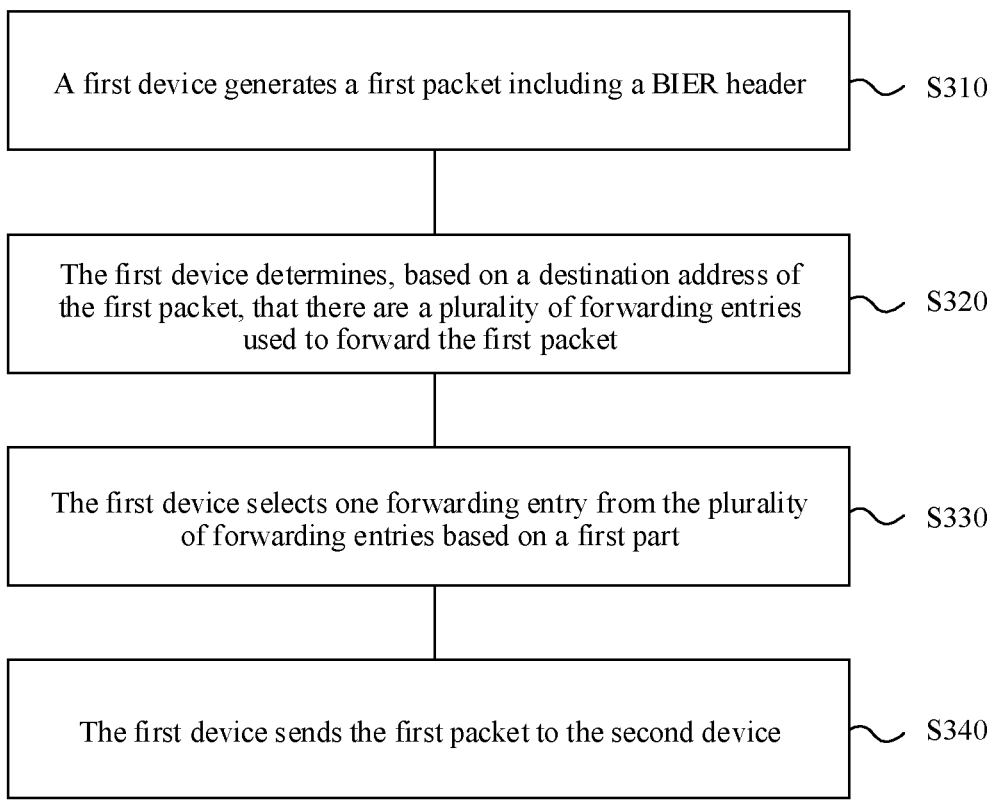
FIG. 3 is a schematic flowchart of a packet sending method according to an embodiment of the present application.

A packet sending method shown in FIG. 3 is described below by using the system 200 shown in FIG. 2 as an example. The specific method includes the following steps.

S310: A first device generates a first packet including a BIER header.

In a possible implementation, the BIER header of the first packet includes entropy. The entropy is used to forward the packet along a forwarding path. A value of an entropy field may be generated based on a default value, or may be assigned by an edge device. If the first device is an edge device, the value of the entropy field may be assigned based on a requirement when the first device generates the packet. The entropy field includes a first part and a second part. Both the first part and the second part are used by a device to determine a sending path. The first part may also be referred to as a first identifier, and the second part may be referred to as a second identifier. The entropy field has 20 bits. The first part and the second part may be different bits of the entropy field. For example, the first part may be a value of a rightmost bit of the entropy field, and the second part may be a value of the second bit counted from right to left of the entropy field. A quantity of bits occupied by the first part and the second part may be selected based on a BIFT of the device. In other words, a greater quantity of BIFTs of the device requires more bits.

In a possible implementation, the entropy value of the BIER header of the first packet may be assigned by the first device, or may be generated based on a default value. The first device determines the entropy value of the BIER header of the first packet based on a quantity of a plurality of forwarding entries that are stored on the first device and that are used to forward the first packet and a quantity of a plurality of forwarding entries that are stored on a second device and that are used to forward the first packet. The first device and the second device are devices at different tiers in a multi-tier network. For example, the first device is a first-stage leaf node or an access tier device, and the second device is a second-stage leaf node or an intermediate tier device. The first device sends the first packet to the second device. The plurality of forwarding entries that are stored on the first device and that are used to forward the first packet may be BIFTs.

In a possible implementation, if the first device is an edge device, the entropy value of the BIER header of the first packet may be assigned by the first device. That there are a plurality of forwarding entries on the first device that are used to forward the first packet means that there are a plurality of load sharing paths on the first device that are used to forward the first packet, and that there are a plurality of forwarding entries on the second device that are used to forward the first packet means that there are a plurality of load sharing paths on the second device that are used to forward the first packet. The first device generates the entropy based on a quantity of load sharing paths on the first device and a quantity of load sharing paths on the second device, so that a forwarding entry used by each device to forward the first packet can be accurately controlled. For example, if the first part is set to 0001, the first device sends the first packet through a first forwarding path in a plurality of forwarding paths; and if the second part is set to 0003, the second device sends the first packet through a third forwarding path in the plurality of forwarding paths. In this way, a forwarding path for forwarding the first packet by each of a plurality of devices is separately controlled. The entropy value may be a sum of a value of the first part of and a value of the second part. The first device selects a corresponding forwarding path for forwarding the packet based on the value of the first part, and the second device selects a corresponding path for forwarding the packet based on the value of the second part.

For example, as shown in FIG. 2, there are two equal-cost paths for sending a packet between the access tier device and the intermediate tier device. In the figure, a path selected by the device A1 to send the first packet to the device C1 or the device D1 is represented by a value of P1. In the figure, a path selected by the device C1 to send the packet to the device S1 or the device S2, or a path used by the device D2 to send the first packet to the device S3 or the device S4 is represented by a value of P2. The first device calculates, based on P1 and P2 and according to (P1−1)*1+(P2−1)*2, an entropy value of the BIER header that needs to be encapsulated, where both P1 and P2 may have a value of 1 or 2. The value is obtained based on that both the device A1 and the device C1 have two equal-cost paths for sending the packet to a next hop. The first device delivers the calculated entropy value to a forwarding plane after the calculation is completed on a control plane.

In a possible implementation, in a multi-stage network, the first device may be an edge device, or may be referred to as a first-stage leaf node or an access tier device. The first device receives the first packet, for example, a multicast packet, outside a BIER domain, and the first device encapsulates the received multicast packet with a BIER header. The BIER header encapsulated by the first device for the multicast packet includes a bit string, and the bit string is used to identify an egress device to which the first packet is sent in the BIER domain.

In a possible implementation, the first device receives a second packet from a fourth device, and generates the first packet by encapsulating the second packet with the BIER header. For example, the edge device receives the second packet from the fourth device outside the BIER domain, and the edge device generates the first packet by encapsulating the second packet with the BIER header.

For example, there are only two paths from the access tier device to the intermediate tier device. Therefore, one bit may be used to distinguish the two paths by using "0" and "1", and the bit may correspond to two BIFTs of the device. If there are three equal-cost paths from the access tier device to the intermediate tier device, and the three equal-cost paths correspond to three BIFTs, two bits are required for distinguishing. For the first part, the first bit and the second bit that are counted from right to left in the entropy are required to distinguish the three different BIFTs, and for the second part, bits starting from the third bit counted from right to left or from the fourth bit counted from right to left may be required. In this application, the first part and the second part are not required to be consecutive bits in the entropy, and bits used by the first part and the second part may be neither consecutive nor overlapped. If there are 48 equal-cost paths from the access tier device to the intermediate tier device, and the 48 equal-cost paths correspond to 48 BIFTs, the first six bits counted from right to left in the entropy need to be used.

S320: The first device determines, based on a destination address of the first packet, that there are a plurality of forwarding entries used to forward the first packet.

In a possible implementation, there are network devices at a plurality of stages in the multi-stage network, the first device is a first-stage leaf node or an access device, and the second device is a second-stage leaf node or an aggregation tier device. There are a plurality of equal-cost multi-paths (ECMP) from the first-stage leaf node to the second-stage leaf node or the aggregation tier device. The access device generates a plurality of BIFTs, and the plurality of forwarding entries correspond to different forwarding paths.

For example, there are two equal-cost paths for the device A1 to send the packet to the intermediate tier devices, and the paths are from the device A1 to the device C1 and from the device A1 to the device D1. The device A1 generates two BIFTs based on the two equal-cost paths, and next hops of the two BIFTs are the device C1 and the device D1.

S330: The first device selects one forwarding entry from the plurality of forwarding entries based on the first part, where the selected forwarding entry includes an address of the second device, and the second device is a next-hop device of the first device.

In a possible implementation, parameters (X, Y) are stored on the first device, where both X and Y are integers, and a value of Y is equal to a quantity of the plurality of equal-cost paths determined by the first device, to be specific, the value of Y is equal to a quantity of the plurality of equal-cost paths for forwarding the first packet that are determined by the first device. For example, if the first device determines that there are three equal-cost paths for sending the first packet to a next-hop device, the value of Y is 3. The first device calculates the entropy of the BIER header of the first packet based on the parameters (X, Y), and obtains a calculation result. The first device may sort the plurality of forwarding entries corresponding to the plurality of equal-cost paths, select one forwarding entry from the plurality of forwarding entries based on the calculation result and a sequence of the forwarding entries, and determine, based on a bit string and the BIFT, that a next hop is the second device. For an implementation method for determining the next hop based on the bit string and the BIFT, refer to descriptions in section 6 "BIER Intra-Domain Forwarding Procedures" in RFC 8279. Details are not described herein again. The second device may be an intermediate tier device in the multi-stage network.

For example, the access tier device A1 in FIG. 2 receives a multicast packet from the host A1, and the multicast packet needs to be sent to the access tier devices A2 and B2. The access tier device A1 receives the multicast packet from the outside of the BIER domain, and encapsulates the multicast packet with a BIER header to constitute a new multicast packet. Because there are two equal-cost paths from the access tier device A1 to the intermediate tier devices, and the paths are from the access tier device A1 to the intermediate tier device C1 and from the access tier device A1 to the intermediate tier device C2, two different BIFTs for the access device A1 to send the multicast packet to a next hop may be included. The access tier device A1 calculates an entropy value of the BIER header based on configured parameters, and then determines the BIFT based on a calculation result. For example, when the calculated value is 0, the next hop is determined based on a first BIFT. If the calculation result is 1, the next hop is determined based on a second BIFT.

For example, parameters (X1, Y1) may be stored on the access device A1, where a value of Y is equal to a quantity of optional BIFTs for the access device to send the multicast packet. The entropy value in the BIER header of the multicast packet is divided by the access device A1 by a parameter X to obtain a value, and then the value is divided by Y to obtain a remainder. The device A1 determines, based on a final obtained result, a BIFT for sending the multicast packet, and then determines the next hop based on the BIFT. For example, if X is set to 1 and Y is set to 2, the entropy value is divided by the device A1 by 1 to obtain an integer and then the integer is divided by 2 to obtain a remainder. If the remainder is 0, it is determined, based on a first BIFT corresponding to 0, that the next-hop device is the device C1, and if the remainder is 1, it is determined, based on a second BIFT corresponding to 1, that the next-hop device is the device D1. The foregoing parameters may be configured based on a requirement. Parameter setting is not limited in this application. A specific BIFT to be used is determined based on the calculation result. For details, refer to descriptions of the forwarding calculation part in section 6.5 and section 6.6 in RFC 8279. Details are not described herein again.

The access tier device A1 determines the BIFT based on the result of calculating the entropy value in the BIER header, and further determines the next hop for sending the packet based on the BIFT. In this way, the packet may be sent to different paths based on different entropy values, thereby implementing traffic load sharing.

S340: The first device sends the first packet to the second device, where the second part is used by the second device to select, from a plurality of forwarding entries used to forward the first packet, a forwarding entry used by the second device to forward the first packet.

In a possible implementation, the second device is an intermediate device in the multi-stage network, and may also be referred to as a second-stage leaf node or an aggregation tier device. Similar to the first device, there are more than two equal-cost paths from the second device to an upper-tier device, and the second device also includes more than two BIFTs. For a method in which the second device sends the second packet to a third device based on the second part, refer to the related method in step S303. To be specific, the second device calculates the second part of the entropy of the BIER header of the first packet by using parameters (X2, Y2) stored on the second device, and selects, based on a calculation result, a forwarding entry for forwarding the first packet. For a specific implementation, refer to the method for selecting a forwarding entry by the first device in step S303. Details are not described herein again.

In a possible implementation, an edge node may encapsulate, with a BIER header, a packet received from the outside of a BIER domain, and assign a value to entropy. For example, if parameters (X1=1, Y1=2) are stored on a first-stage device, parameters (X2=X1*Y1=2, Y2=2) are stored on a second-stage device, where a value of Y1 is equal to a quantity of paths for the first-stage device to forward the packet, and a value of Y2 is equal to a quantity of paths for the second-stage device to forward the packet. Entropy= (P1−1)*X1+(P2−1)*X2 is assigned when the first-stage device encapsulates the packet with the BIER header, where a value of P1 is an integer ranging from 1 to 2, and a value of P2 is an integer ranging from 1 to 2. The value of the entropy may be 0, 1, 2, or 3 based on the foregoing values. For another example, if there are two load sharing paths for the first-stage device, and there are 48 load sharing paths for the second-stage device, parameters (X1=1, X2=2) are stored on the first-stage device, and parameters (X2=X1*Y1=2, Y2=48) are stored on the second-stage device. In this case, entropy=(P1−1)*X1+(P2−1)*X2 is assigned when the edge node encapsulates the packet with the BIER header, where P1 may be an integer ranging from 1 to 2, and P2 may be an integer ranging from 1 to 48. According to the foregoing solution, based on the parameters stored by the access tier device and the intermediate tier device, calculation is performed separately by using the parameters of the access tier and the first part and by using the parameters of the intermediate tier device and the second part. That is, the entropy is used by parts, for example, N bits on the right of the entropy are the first part, or M bits in the middle are the second part, or N bits in the entropy are selected by division, where both M and N are integers greater than 0. In this way, traffic load sharing is implemented. In addition, the entropy value may be assigned by the access tier device, so that paths for allocating traffic are controllable, to help evenly allocate the traffic on different paths.

Two method embodiments in which the entropy value is used by parts are provided below according to this application.

Method 1: The method 1 is described by using FIG. 2 as an example. There are two paths from the access device A1 to the intermediate tier devices C1 and C2. Two BIFTs are established based on the two different paths. A forwarding table 1 corresponds to a forwarding path on which a next hop is the intermediate tier device C1, and a forwarding table 2 corresponds to a forwarding path on which a next hop is the intermediate tier device D1. To determine a BIFT used for sending the packet, two parameters (X1=1, Y1=2) may be stored on the access tier device A1. The entropy value may be divided by X to obtain an integer, and then the integer is divided by Y to obtain a remainder. The access device A1 selects, based on a relationship between a calculation result and the BIFT, the BIFT for forwarding the packet. For example, if the remainder is 0, a BIFT that ranks first in a BIFT sequence is selected, or if the remainder is 1, a BIFT that ranks second in a BIFT sequence is selected. For the intermediate tier device C1, two parameters (X2=2, Y2=2) may be set, indicating that an integer is obtained by dividing the entropy value by X, and then a remainder is obtained by dividing the integer by Y. The access device A1 determines, based on a correspondence between a calculation result and a BIFT, the BIFT for forwarding the packet. For example, if the remainder is 0, a BIFT that ranks first in a BIFT sequence is selected, or if the remainder is 1, a BIFT that ranks second in a BIFT sequence is selected. Details are as follows.

If the entropy value is 0, and for the access device A1, a calculation result is 0, the access device A1 selects a BIFT corresponding to the value 0, and the access device determines, based on the BIFT, that a next hop is C1. For the intermediate tier device C1, a calculation result is 0, and the intermediate tier device C1 selects a BIFT corresponding to 0, and determines, based on the BIFT, that a next hop is the upper-tier device S1. In this way, it may be determined that a forwarding path of the packet is: The access tier device A1 sends the packet to the intermediate tier device C1, and then the intermediate tier device sends the packet to the upper-tier device S1.

If the entropy value is 1, and for the access device A1, a calculation result is 1, the access device A1 selects a BIFT corresponding to the value 1, and the access device determines, based on the BIFT, that a next hop is D1. For the intermediate tier device D1, a calculation result is 0, and the intermediate tier device D1 selects a BIFT corresponding to 0, and determines, based on the BIFT, that a next hop is the upper-tier device S4. In this way, it may be determined that a forwarding path of the packet is: The access tier device A1 sends the packet to the intermediate tier device D1, and then the intermediate tier device sends the packet to the upper-tier device S4.

If the entropy value is 2, and for the access device A1, a calculation result is 0, the access device A1 selects a BIFT corresponding to the value 0, and the access device determines, based on the BIFT, that a next hop is C1. For the intermediate tier device C1, a calculation result is 1, and the intermediate tier device C1 selects a BIFT corresponding to 1, and determines, based on the BIFT, that a next hop is the upper-tier device S2. In this way, it may be determined that a forwarding path of the packet is: The access tier device A1 sends the packet to the intermediate tier device C1, and then the intermediate tier device sends the packet to the upper-tier device S2.

If the entropy value is 3, and for the access device A1, a calculation result is 1, the access device A1 selects a BIFT corresponding to the value 1, and the access device determines, based on the BIFT, that a next hop is D1. For the intermediate tier device D1, a calculation result is 1, and the intermediate tier device D1 selects a BIFT corresponding to 1, and determines, based on the BIFT, that a next hop is the upper-tier device S3. In this way, it may be determined that a forwarding path of the packet is: The access tier device A1 sends the packet to the intermediate tier device D1, and then the intermediate tier device sends the packet to the upper-tier device S3.

Binary may be used for calculation in the foregoing method. The first part may be the first bit on the right of the entropy field, and the second part may be the second bit counted from right to left. Details are as follows.

If Entropy=(0000 0000 0000 0000 0000), and the first bit on the right is 0, the access device A1 selects a BIFT corresponding to the value 0, and the access device determines, based on the BIFT, that a next hop is C1. The second bit on the right is 0, and the intermediate tier device C1 selects a BIFT corresponding to 0, and determines, based on the BIFT, that a next hop is the upper-tier device S1. In this way, it may be determined that a forwarding path of the packet is: The access tier device A1 sends the packet to the intermediate tier device C1, and then the intermediate tier device sends the packet to the upper-tier device S1.

If Entropy=(0000 0000 0000 0000 0001), and the first bit on the right is 1, the access device A1 selects a BIFT corresponding to the value 1, and the access device determines, based on the BIFT, that a next hop is D1. The second bit on the right is 0, and the intermediate tier device D1 selects a BIFT corresponding to 0, and determines, based on the BIFT, that a next hop is the upper-tier device S4. In this way, it may be determined that a forwarding path of the packet is: The access tier device A1 sends the packet to the intermediate tier device D1, and then the intermediate tier device sends the packet to the upper-tier device S4.

If Entropy=(0000 0000 0000 0000 0010), and the first bit on the right is 0, the access device A1 selects a BIFT corresponding to the value 0, and the access device determines, based on the BIFT, that a next hop is C1. The second bit on the right is 1, and the intermediate tier device C1 selects a BIFT corresponding to 1, and determines, based on the BIFT, that a next hop is the upper-tier device S2. In this way, it may be determined that a forwarding path of the packet is: The access tier device A1 sends the packet to the intermediate tier device C1, and then the intermediate tier device sends the packet to the upper-tier device S2.

If Entropy=(0000 0000 0000 0000 0011), and the first bit on the right is 1, the access device A1 selects a BIFT corresponding to the value 1, and the access device determines, based on the BIFT, that a next hop is D1. The second bit on the right is 1, and the intermediate tier device D1 selects a BIFT corresponding to 1, and determines, based on the BIFT, that a next hop is the upper-tier device S3. In this way, it may be determined that a forwarding path of the packet is: The access tier device A1 sends the packet to the intermediate tier device D1, and then the intermediate tier device sends the packet to the upper-tier device S3.

Method 2: Parameters X and Y may be set for devices at all tiers in the multi-stage network, where values of the parameters X and Y are both set to an exponent of 2. For example, parameters $(X=2^0, Y=2^1)$ are set for the access tier device, and parameters $(X=2^1, Y=2^1)$ are set for the intermediate tier device. Meanings and usages of the parameters are the same as those of the parameters in Method 1. In Embodiment 2, an algorithm can be simplified when a part of the entropy value of the BIER header of the packet is used by each device.

For the access tier device, the entropy value is divided by $2^0$ and then a value obtained through division is divided by $2^1$ to obtain a remainder. This may be simplified as follows: The entropy value is shifted to the right by zero bit and then a value obtained through shifting is divided by Y to obtain a remainder. For a method for determining the BIFT used by the access tier device based on a remainder result and determining the next hop, refer to the method in Embodiment 1. Details are not described herein again.

For the intermediate tier device, the entropy value is divided by $2^1$ and then a value obtained through division is divided by $2^1$ to obtain a remainder. This may be simplified as follows: The entropy value is shifted to the right by one bit, and then a value obtained through shifting is divided by Y to obtain a remainder.

In Method 2, 20 bits are included in the entropy value. A value of the rightmost bit may be the first part, and the value of the bit determines a path to be selected by the access tier device; and a value of the second bit counted from the right may be the second part, and the value of the bit determines a path to be selected by the intermediate tier device. Because there are only two load sharing paths for the access tier device in FIG. 2, two different paths may be represented by using two values: a value 0 and a value 1 of one bit. Similarly, a value of the second bit counted from right to left of the entropy value determines a path to be selected by the intermediate tier device. Because there are only two load sharing paths for the intermediate tier device in FIG. 2, two different paths may be represented by using two values: a value 0 and a value 1 of one bit.

If three paths from the access tier device to the upper-tier device are selected, the first and second bits on the right of the 20 bits may be used to represent the three paths. In this case, parameters of the access tier device are $(X=2^0, Y=2^2)$. In the parameters, X and Y respectively indicate a bit position and a bit length. For example, the parameters indicate two bits starting from the rightmost bit. If 48 paths are selected for the intermediate tier device, six bits in 20 bits may be used to represent the 48 paths. In this case, parameters of the intermediate tier device are $(X=2^2, Y=2^6)$, and the parameters indicate six bits starting from the second rightmost bit. In this solution, the intermediate tier device may select the six bits starting from the second rightmost bit, or may select six bits starting from the third rightmost bit, or the like. Consecutive bits are not required for the first part and the second part in this application.

Figure 4:
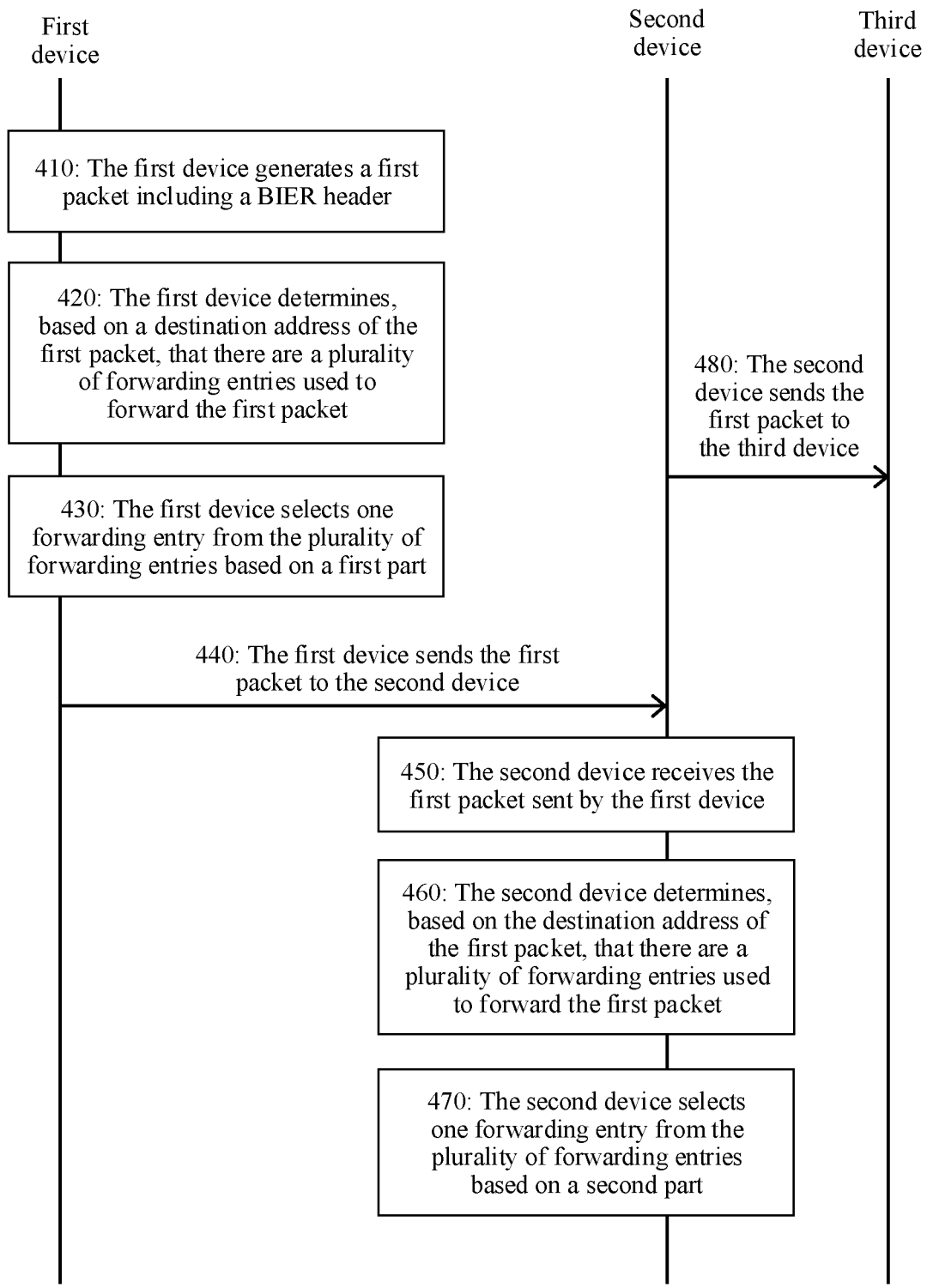
FIG. 4 is a schematic flowchart of another packet sending method according to an embodiment of the present application.

FIG. 4 is a schematic flowchart of another packet sending method according to this application. A first device may be the device A1, B1, A2, or B2 in FIG. 2, or may be the first device in the method flowchart in FIG. 3; and may implement a function of the first device in FIG. 3. A second device may be the device C1, D1, C2, or D2 in FIG. 2. The method includes the following steps.

S410: The first device generates a first packet including a BIER header. For a specific implementation of this step, refer to step S301 in FIG. 3. Details are not described herein again.

S420: The first device determines, based on a destination address of the first packet, that there are a plurality of forwarding entries used to forward the first packet. For a specific implementation of this step, refer to step S302 in FIG. 3. Details are not described herein again.

S430: The first device selects one forwarding entry from the plurality of forwarding entries based on a first part, where a next hop in the forwarding entry is the second device. For a specific implementation of this step, refer to step S303 in FIG. 3. Details are not described herein again.

S440: The first device sends the first packet to the second device.

S450: The second device receives the first packet of the first device.

S460: The second device determines, based on the destination address of the first packet, that there are a plurality of forwarding entries used to forward the first packet.

In a possible implementation, the second device receives the first packet, and determines, based on a destination address carried in the first packet, that there are a plurality of equal-cost paths; and correspondingly, on the second device, there are a plurality of forwarding entries used to forward the first packet to a next hop.

S470: The second device selects one forwarding entry from the plurality of forwarding entries based on a second part. For a specific implementation of this step, refer to step S303 in FIG. 3. Details are not described herein again.

S480: The second device sends the first packet to a third device.

In a possible implementation, the second device is an intermediate tier device in a multi-stage network, the third device is a first-tier device or a core device, and there are a plurality of equal-cost paths for sending the first packet by the second device to the third device. The second device selects one forwarding entry from the plurality of forwarding entries based on the second part, and sends the first packet to the third device based on the selected forwarding entry.

In a possible implementation, entropy of the BIER header of the first packet further includes a third part, and the third part is used by the third device to select one BIFT from a plurality of BIFTs.

Figure 5:
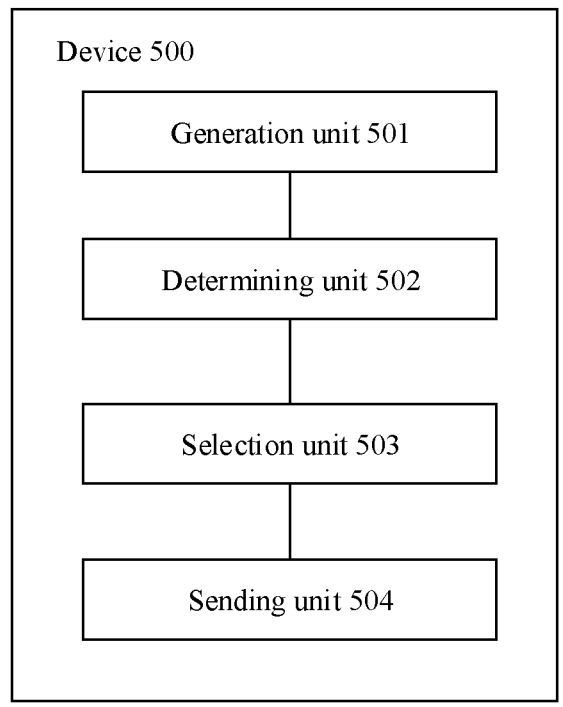
FIG. 5 shows a packet sending device according to an embodiment of the present application.

As shown in FIG. 5, a packet sending device is provided in this application. The device may be the device B in FIG. 1, may be the device A1, B1, A2, or B2 in FIG. 2, or may be the first device in the method flowchart in FIG. 3 and the method flowchart in FIG. 4; and may implement a function of the first device. The first device includes a generation unit 501, a determining unit 502, a selection unit 503, and a sending unit 504.

In a possible implementation, the generation unit 501 is configured to generate a first packet including a BIER header. The BIER header includes entropy, and the entropy is used to forward the first packet along a forwarding path. The entropy includes a first part and a second part, and the first part is different from the second part. The determining unit 502 is configured to determine, based on a destination address of the first packet, that there are a plurality of forwarding entries used to forward the first packet. The selection unit 503 is configured to select one forwarding entry from the plurality of forwarding entries based on the first part. The selected forwarding entry includes an address of a second device, and the second device is a next-hop device of the first device. The sending unit 504 is configured to send the first packet to the second device. The second part is used by the second device to select one forwarding entry from a plurality of forwarding entries used to forward the first packet.

In a possible implementation, the first part and the second part occupy different bits of the entropy.

In a possible implementation, the determining unit 502 is further configured to determine an entropy value of the BIER header of the first packet based on a quantity of the plurality of forwarding entries on the first device that are used to forward the first packet and a quantity of the plurality of forwarding entries on the second device that are used to forward the first packet.

In a possible implementation, the device further includes a receiving unit, where the receiving unit is configured to receive a second packet from a fourth device. The generation unit 501 is configured to generate the first packet by encapsulating the second packet with the BIER header.

In the specific implementation, for specific implementations of the generation unit 501, the determining unit 502, the selection unit 503, and the sending unit 504, refer to functions and implementation steps of the first device in FIG. 3 and FIG. 4. For brevity, details are not described again.

Figure 6:
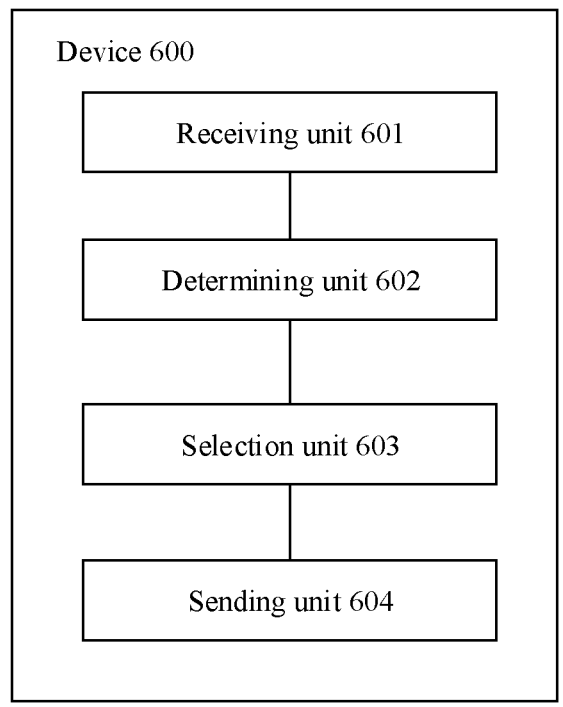
FIG. 6 shows another packet sending device according to an embodiment of the present application.

As shown in FIG. 6, a packet sending device is provided in this application. The device may be the device C1, D1, C2, or D2 in FIG. 2, or may be the second device in the method flowchart in FIG. 3 and the method flowchart in FIG. 4; and may implement a function of the second device. The second device includes a receiving unit 601, a determining unit 602, a selection unit 603, and a sending unit 604.

In a possible implementation, the receiving unit 601 is configured to receive a first packet sent by a first device. The first packet includes a BIER header, and the BIER header includes entropy. The entropy is used to forward the first packet along a forwarding path, the entropy includes a first part and a second part, and the first part is different from the second part. The first part is used by the first device to select one forwarding entry from a plurality of forwarding entries used to forward the first packet. The determining unit 602 is configured to determine, based on a destination address of the first packet, that there are a plurality of forwarding entries used to forward the first packet. The selection unit 603 is configured to select one forwarding entry from the plurality of forwarding entries based on the second part. The selected forwarding entry includes an address of a third device, and the third device is a next-hop device of the second device. The sending unit 604 is configured to send the first packet to the third device.

In a possible implementation, the first part and the second part occupy different bits of the entropy.

In a possible implementation, an entropy value of the BIER header of the first packet is determined based on a quantity of the plurality of forwarding entries on the first device that are used to forward the first packet and a quantity of the plurality of forwarding entries on the second device that are used to forward the first packet.

In the specific implementation, for specific implementations of the receiving unit 601, the determining unit 602, the selection unit 603, and the sending unit 604, refer to functions and implementation steps of the second device in FIG. 3 and FIG. 4. For brevity, details are not described again.

Figure 7:
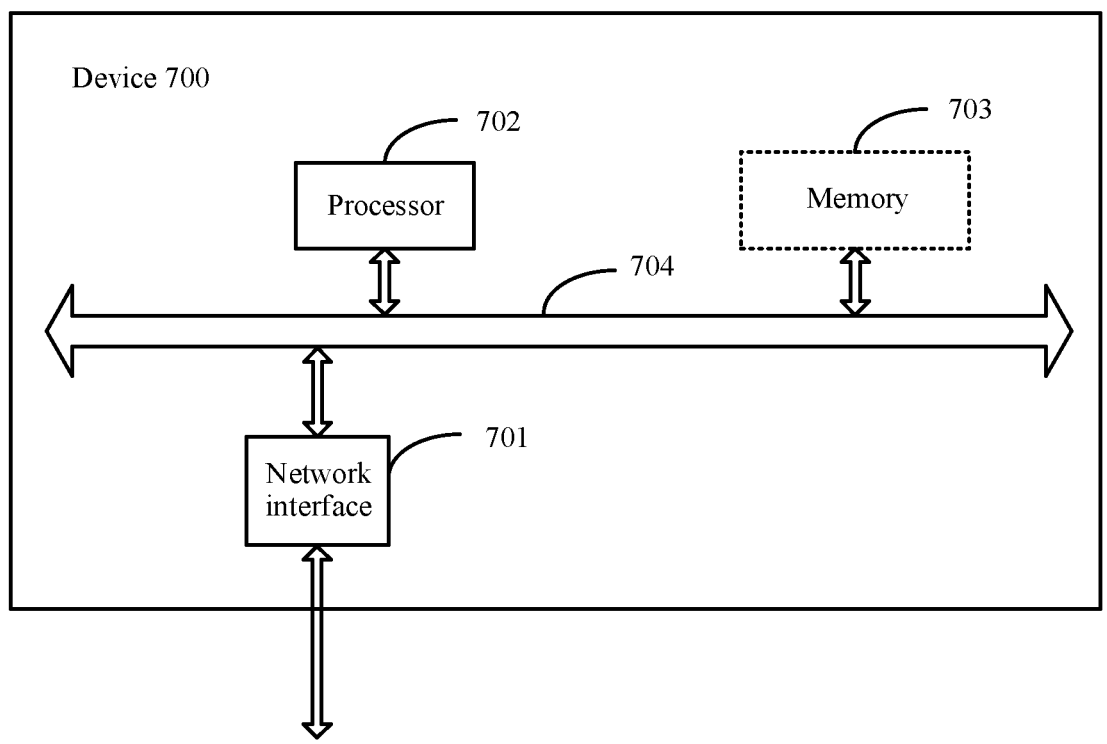
FIG. 7 shows still another packet sending device according to an embodiment of the present application.

As shown in FIG. 7, another first device is provided in this application. The first device may be the device B in FIG. 1, may be the device A1, B1, A2, or B2 in FIG. 2, or may be the first device in the method flowchart in FIG. 3 and the method flowchart in FIG. 4; and may implement a function of the first device. The first device includes a network interface 701 and a processor 702, and may further include a memory 703.

The processor 702 includes, but is not limited to, one or more of a central processing unit (CPU), a network processor (NP), an application-specific integrated circuit (ASIC), or a programmable logic device (PLD). The PLD may be a complex programmable logic device (CPLD), a field-programmable gate array (FPGA), a generic array logic (GAL), or any combination thereof. The processor 702 is responsible for management of a bus 704 and general processing, and may further provide various functions, including timing, peripheral interfaces, voltage regulation, power management, and another control function. The memory 703 may be configured to store data used when the processor 702 performs an operation, for example, store a forwarding entry used by the first device to forward a first packet.

The network interface 701 may be a wired interface, for example, a fiber distributed data interface (FDDI), or an Ethernet interface. The network interface 701 may alternatively be a wireless interface, for example, a wireless local area network interface.

The memory 703 may include, but is not limited to, a content addressable memory (CAM), for example, a ternary content addressable memory (CAM) or a random access memory (RAM).

The memory 703 may alternatively be integrated into the processor 702. If the memory 703 and the processor 702 are components independent of each other, the memory 703 is connected to the processor 702. For example, the memory 703 and the processor 702 may communicate with each other through the bus. The network interface 701 and the processor 702 may communicate with each other through the bus, or the network interface 701 may directly be connected to the processor 702.

The bus 704 may include any quantity of interconnected buses and bridges, and the bus 704 connects various circuits including one or more processors 702 represented by the processor 702 and a memory represented by the memory 703. The bus 704 may further connect various other circuits such as a peripheral device, a voltage stabilizer, and a power management circuit. These are all well known in the art, and therefore are not described in further detail in this specification.

In a possible implementation, the network interface 701 is configured to send the first packet to a second device. A second part of entropy of a BIER header of the first packet is used by the second device to select one forwarding entry from a plurality of forwarding entries used to forward the first packet. The processor 702 is configured to generate the first packet including the BIER header; is further configured to determine, based on a destination address of the first packet, that there are a plurality of forwarding entries used to forward the first packet; and is configured to select one forwarding entry from the plurality of forwarding entries based on a first part. The BIER header includes the Entropy. The entropy is used to forward the first packet along a forwarding path. The entropy includes the first part and the second part, and the first part is different from the second part. The selected forwarding entry includes an address of the second device, and the second device is a next-hop device of the device.

In a possible implementation, the first part and the second part occupy different bits of the entropy.

In a possible implementation, the processor 702 is further configured to determine an entropy value of the BIER header of the first packet based on a quantity of the plurality of forwarding entries on the first device that are used to forward the first packet and a quantity of the plurality of forwarding entries on the second device that are used to forward the first packet.

In a possible implementation, the device further includes a receiving unit, where the receiving unit is configured to receive a second packet from a fourth device. The generation unit is configured to generate the first packet by encapsulating the second packet with the BIER header.

In the specific implementation, for specific implementations of the processor 702 and the network interface 701, refer to functions and implementation steps of the first device in FIG. 3 and FIG. 4. For brevity, details are not described again.

Figure 8:
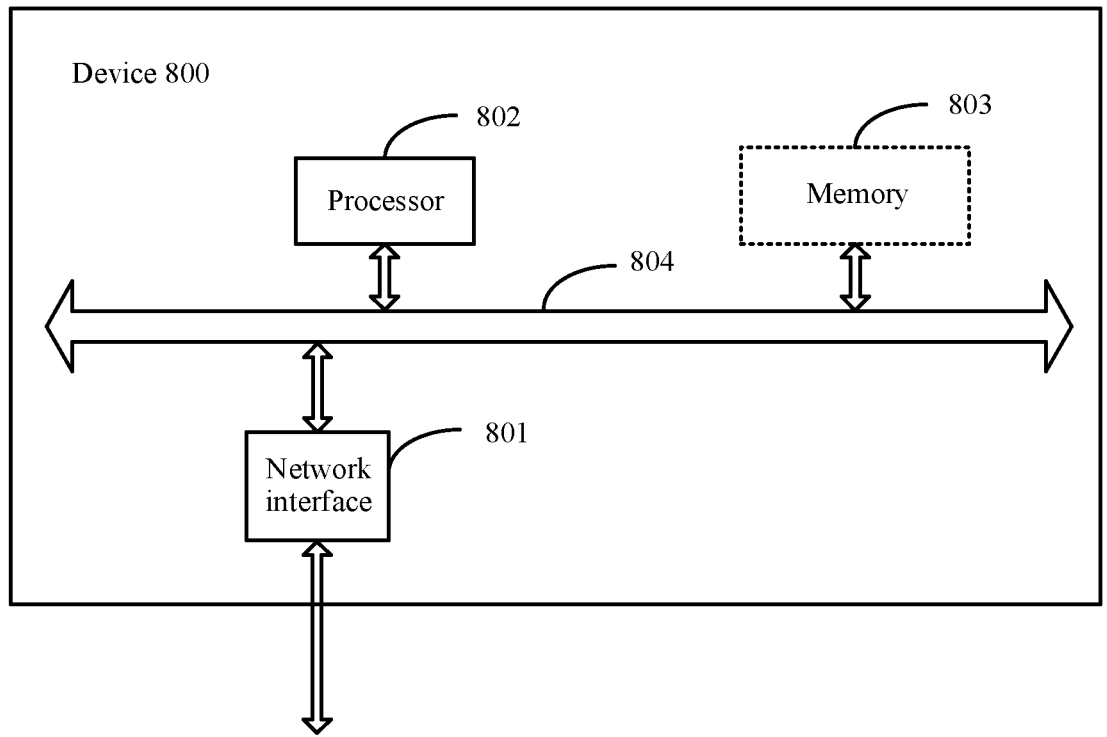
FIG. 8 shows yet another packet sending device according to an embodiment of the present application.

As shown in FIG. 8, another packet sending device is provided in this application. The device may be the device C1, D1, C2, or D2 in FIG. 2, or the device may be the second device in the method flowchart in FIG. 3 and the method flowchart in FIG. 4; and may implement a function of the second device. The device includes a network interface 801 and a processor 802, and may further include a memory 803.

The processor 802 includes, but is not limited to, one or more of a central processing unit (CPU), a network processor (NP), an application-specific integrated circuit (ASIC), or a programmable logic device (PLD). The PLD may be a complex programmable logic device (CPLD), a field-programmable gate array (FPGA), a generic array logic (GAL), or any combination thereof. The processor 802 is responsible for management of a bus 804 and general processing, and may further provide various functions, including timing, peripheral interfaces, voltage regulation, power management, and another control function. The memory 803 may be configured to store data used when the processor 802 performs an operation, for example, may store a forwarding entry used by the second device to forward a first packet.

The network interface 801 may be a wired interface, for example, a fiber distributed data interface (FDDI), or an Ethernet interface. The network interface 801 may alternatively be a wireless interface, for example, a wireless local area network interface.

The memory 803 may include, but is not limited to, a content addressable memory (CAM), for example, a ternary content addressable memory (TCAM) or a random access memory (RAM).

The memory 803 may alternatively be integrated into the processor 802. If the memory 803 and the processor 802 are components independent of each other, the memory 803 is connected to the processor 802. For example, the memory 803 and the processor 802 may communicate with each other through the bus. The network interface 801 and the processor 802 may communicate with each other through the bus, or the network interface 801 may directly be connected to the processor 802.

The bus 804 may include any quantity of interconnected buses and bridges, and the bus 804 connects various circuits including one or more processors 802 represented by the processor 802 and a memory represented by the memory 803. The bus 804 may further connect various other circuits such as a peripheral device, a voltage stabilizer, and a power management circuit. These are all well known in the art, and therefore are not described in further detail in this specification.

In a possible implementation, the network interface 801 is configured to receive the first packet and send the first packet to a third device. The first packet includes a BIER header, and the BIER header includes entropy. The entropy is used to forward the first packet along a forwarding path, the entropy includes a first part and a second part, and the first part is different from the second part. The first part is used by a first device to select one forwarding entry from a plurality of forwarding entries used to forward the first packet. The processor 802 determines, based on a destination address of the first packet, that there are a plurality of forwarding entries used to forward the first packet, and selects one forwarding entry from the plurality of forwarding entries based on the second part. The selected forwarding entry includes an address of the third device, and the third device is a next-hop device of the second device.

In a possible implementation, the first part and the second part occupy different bits of the entropy.

In a possible implementation, an entropy value of the BIER header of the first packet is determined based on a quantity of the plurality of forwarding entries on the first device that are used to forward the first packet and a quantity of the plurality of forwarding entries on the second device that are used to forward the first packet.

In the specific implementation, for specific implementations of the processor 802 and the network interface 801, refer to functions and implementation steps of the second device in FIG. 3 and FIG. 4. For brevity, details are not described again.

Figure 9:
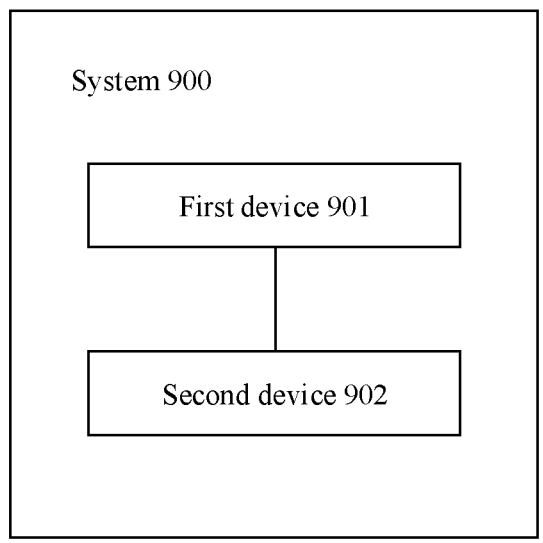
FIG. 9 shows a packet sending system according to an embodiment of the present application.

As shown in FIG. 9, a packet sending system is provided in this application. The system includes a first device 901 and a second device 902.

In a possible implementation, the first device 901 is configured to: generate a first packet including a BIER header, determine, based on a destination address of the first packet, that there are a plurality of forwarding entries used to forward the first packet, select one forwarding entry from the plurality of forwarding entries based on a first part, and send the first packet to the second device. The BIER header includes Entropy. The entropy is used to forward the first packet along a forwarding path. The entropy includes the first part and a second part, and the first part is different from the second part. The selected forwarding entry includes an address of the second device 902, and the second device 902 is a next-hop device of the first device 901.

The second device 902 is configured to: receive the first packet sent by the first device 901, determine, based on the destination address of the first packet, that there are a plurality of forwarding entries used to forward the first packet, select one forwarding entry from the plurality of forwarding entries based on the second part, and send the first packet to a third device. The third device is a next-hop device of the second device.

In a possible implementation, the first part and the second part occupy different bits of the entropy.

In a possible implementation, the first device 901 is further configured to determine an entropy value of the BIER header of the first packet based on a quantity of the plurality of forwarding entries on the first device 901 that are used to forward the first packet and a quantity of the plurality of forwarding entries on the second device 902 that are used to forward the first packet.

In a possible implementation, the first device 901 is further configured to: receive a second packet from a fourth device, and generate the first packet by encapsulating the second packet with the BIER header.

The first device may be the device B in FIG. 1, may be the device A1, B1, A2, or B2 in FIG. 2, or may be the first device in the method flowchart in FIG. 3 and the method flowchart in FIG. 4; and may implement a function of the first device. The second device may be the device C1, D1, C2, or D2, or the device may be the second device in the method flowchart in FIG. 3 and the method flowchart in FIG. 4; and may implement a function of the second device.

In the foregoing implementation, for a specific implementation of the first device 901, refer to functions and implementation steps of the first device in FIG. 3 and FIG. 4. For a specific implementation of the second device 902, refer to functions and implementation steps of the second device in FIG. 3 and FIG. 4. For brevity, details are not described again.

It should be understood that sequence numbers of the foregoing method do not mean execution sequences in various embodiments of this application. The execution sequences of the method should be determined based on functions and internal logic of the method, and should not be construed as any limitation on the implementation processes of the embodiments of this application.

In the several embodiments provided in this application, it should be understood that the disclosed method and device may be implemented in another manner. For example, the described apparatus embodiment is merely an example. For example, division into modules is merely logical function division and may be other division in actual implementation. For example, a plurality of modules or components may be combined or integrated into another system, or some features may be ignored or not performed. In addition, the displayed or discussed mutual couplings or direct couplings or communications connections may be implemented through some interfaces. The indirect couplings or communications connections between the apparatuses or units may be implemented in electrical, mechanical, or another form.

The modules described as separate parts may or may not be physically separate, and parts displayed as modules may or may not be physical units, may be located in one position, or may be distributed on a plurality of network units. Some or all of the units may be selected based on an actual requirement to achieve the objectives of the solutions of the embodiments.

In addition, functional modules in the embodiments of the present application may be integrated into one processing unit, or each of the modules may exist alone physically, or two or more modules are integrated into one unit. The integrated module may be implemented in a form of hardware, or may be implemented in a form of hardware in addition to a software functional unit.

When the integrated unit is implemented in the form of hardware combined with software and sold or used as an independent product, the software may be stored in a computer-readable storage medium. Based on such an understanding, some technical features of the technical solutions of the present application that contribute to the prior art may be embodied in a form of a software product. The computer software product is stored in a storage medium, and includes several instructions for instructing a computer device (which may be a personal computer, a server, a network device, or the like) to perform some or all steps of the methods described in the embodiments of the present application. The foregoing storage medium may be a USB flash drive, a removable hard disk, a read-only memory (ROM), a random access memory (RAM), a magnetic disk, or an optical disc.

The foregoing descriptions are merely specific embodiments of the present application, but are not intended to limit the protection scope of the present application. Any variation or replacement readily figured out by a person skilled in the art within the technical scope disclosed in the present application shall fall within the protection scope of the present application. Therefore, the protection scope of the present application shall be subject to the protection scope of the claims.

What is claimed is:

1. A packet sending method by a first device, comprising:
generating a first packet comprising a bit index explicit replication (BIER) header, wherein the BIER header comprises a two part entropy value having a first part and a second part that is different from the first part, wherein the entropy value indicates at least one forwarding path;
determining, based on the first packet, that there are a first plurality of forwarding entries that identify second devices;
selecting one forwarding entry from the first plurality of forwarding entries based on the first part of the two part entropy value, wherein the selected forwarding entry identifies a second device; and
sending, by the first device, the first packet to the second device based on the selected forwarding entry.

2. The method according to claim 1, wherein the first part and the second part of the two part entropy value occupy different bit locations of the entropy value.

3. The method according to claim 1, wherein the first device determines the entropy value based on a quantity of the first plurality of forwarding entries on the first device that are used to forward the first packet and a quantity of the second plurality of forwarding entries on the second device that are used to forward the first packet.

4. The method according to claim 1, wherein the BIER header comprises:
receiving, by the first device, a second packet from a fourth device; and
generating the first packet by encapsulating the second packet with the BIER header.

5. The method according to claim 1, wherein: the first device and the second device are devices at different tiers in a multi-tier network,
the first device is an access tier device, and
the second device is an intermediate tier device.

6. A first device, comprising:
a memory comprising instructions; and
a processor coupled to the memory, wherein the processor is configured to execute the instructions to cause the first device to:
generate a first packet comprising a bit index explicit replication (BIER) header, wherein the BIER header comprises an entropy value that further comprises a first part and a second part that is different from the first part, wherein the entropy value indicates at least one forwarding path;
determine, based on the first packet, that there are a first plurality of forwarding entries that identify second devices;
select one forwarding entry from the first plurality of forwarding entries based on the first part, wherein the selected forwarding entry identifies a second device; and
send the first packet having the two part entropy value to the second device.

7. The first device according to claim 6, wherein the first part and the second part the two part entropy value occupy different bit locations of the two part entropy value.

8. The first device according to claim 6, wherein the processor is further configured to execute the instructions to:
determine the two part entropy value based on a quantity of the first plurality of forwarding entries on the first device that are used to forward the first packet and a quantity of the second plurality of forwarding entries on the second device that are used to forward the first packet.

9. The first device according to claim 6, wherein the processor is further configured to execute the instructions to:
receive a second packet from a fourth device; and
generate the first packet by encapsulating the second packet with the BIER header.

10. The first device according to claim 6, wherein the two part entropy value comprises an entropy field that is 20 bits long.

11. The first device according to claim 6, wherein the first device is in a multi-tier network, the first device is an access tier device.

12. A second device, comprising:
a memory comprising instructions; and
a processor coupled to the memory, wherein the processor is configured to execute the instructions to cause the second device to:
receive a first packet sent by the first device, wherein the first packet comprises a bit index explicit replication (BIER) header, wherein the BIER header comprises an entropy value that further comprises a first part and a second part that is different from the first part, wherein the entropy value indicates a forwarding path;
determine, based on the first packet, that there are a second plurality of forwarding entries that identify second devices;
select one forwarding entry from the second plurality of forwarding entries based on the second part, wherein the selected forwarding entry identifies a third device; and
send the first packet to the third device.

13. The second device according to claim 12, wherein the first part and the second part of the two part entropy value occupy different bit locations of the two part entropy value.

14. The second device according to claim 12, wherein an entropy value of the two part entropy value is determined based on a quantity of a first plurality of forwarding entries on the first device that are used to forward the first packet and a quantity of the second plurality of forwarding entries on the second device that are used to forward the first packet.

15. The second device according to claim 12, wherein the second device is in a multi-tier network, the second device is an intermediate tier device.

16. A packet sending system, wherein the system comprises a first device and a second device, wherein:
the first device is configured to:
generate a first packet comprising a bit index explicit replication, BIER, header;
determine, based on the first packet, that there are a first plurality of forwarding entries used to forward the first packet;
select one forwarding entry from the first plurality of forwarding entries based on a first part; and
send the first packet to the second device, wherein the BIER header comprises an entropy value, the entropy value is used to forward the first packet along a forwarding path, the entropy value comprises the first part and a second part, the first part is different from the second part, the selected forwarding entry comprises an address of the second device; and the second device is configured to:
  receive the first packet, determine, based on the first packet, that there are a second plurality of forwarding entries used to forward the first packet,
  select one forwarding entry from the second plurality of forwarding entries based on the second part, and
  send the first packet to a third device.

\* \* \* \* \*